United States Patent [19]

Heise

[11] 4,419,063

[45] Dec. 6, 1983

[54] BLOW MOLDING DETABBER

[76] Inventor: Brooks B. Heise, 14 Westminster Dr., West Hartford, Conn. 06107

[21] Appl. No.: 356,220

[22] Filed: Mar. 8, 1982

[51] Int. Cl.³ ................... B29C 17/07; B29C 17/12
[52] U.S. Cl. .................... 425/107; 264/536; 425/527; 425/DIG. 5
[58] Field of Search .......... 425/107, 527, 531, 806 R, 425/DIG. 5; 264/536; 225/101

[56] References Cited

U.S. PATENT DOCUMENTS

| | | | |
|---|---|---|---|
| 1,615,800 | 1/1927 | Eaton | 425/107 X |
| 3,546,747 | 12/1970 | Stefaniak et al. | 425/107 X |
| 3,669,603 | 6/1972 | Keller et al. | 425/DIG. 5 |
| 3,841,823 | 10/1974 | Hehl | 425/107 X |
| 3,901,637 | 8/1975 | Eggert | 425/527 |
| 3,910,742 | 10/1975 | Lynn | 425/527 |

FOREIGN PATENT DOCUMENTS 916023  1/1963  United Kingdom ................ 425/107

Primary Examiner—Jan H. Silbaugh
Attorney, Agent, or Firm—Hayes & Reinsmith

[57] ABSTRACT

A detabber apparatus is disclosed for use with a blow molding machine for removing a tab forming at an end of a blow molded object. The detabber apparatus features a jaw mounted on a movable support of a carriage for movement between a first operative tab engaged position and a second remote tab stripped position. Power operating means is drivingly connected to the movable support of the carriage for moving the jaw between said first and second positions. The jaw movement is provided along a generally straight line path defined by a cam and cam follower means operatively mounted in the carriage. The carriage incorporates isolated lubrication passageways for the carriage cam and cam follower means in remote isolated relation to the object to be molded.

8 Claims, 12 Drawing Figures

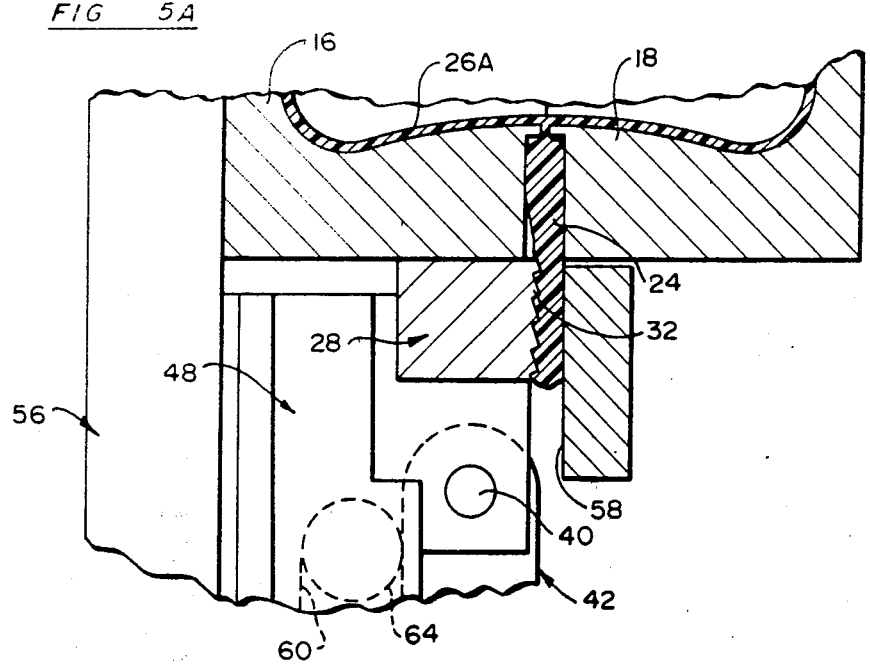
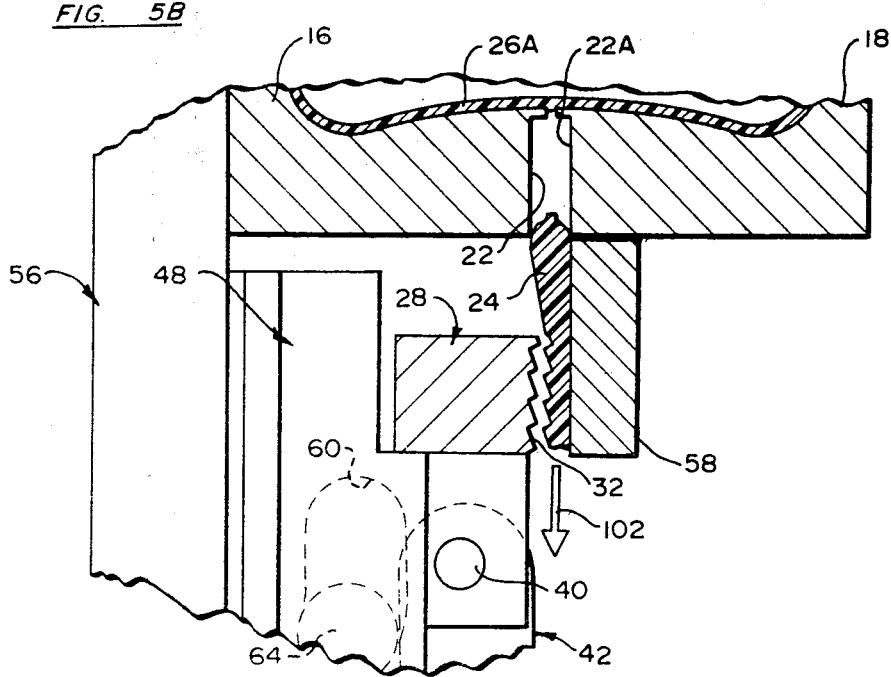

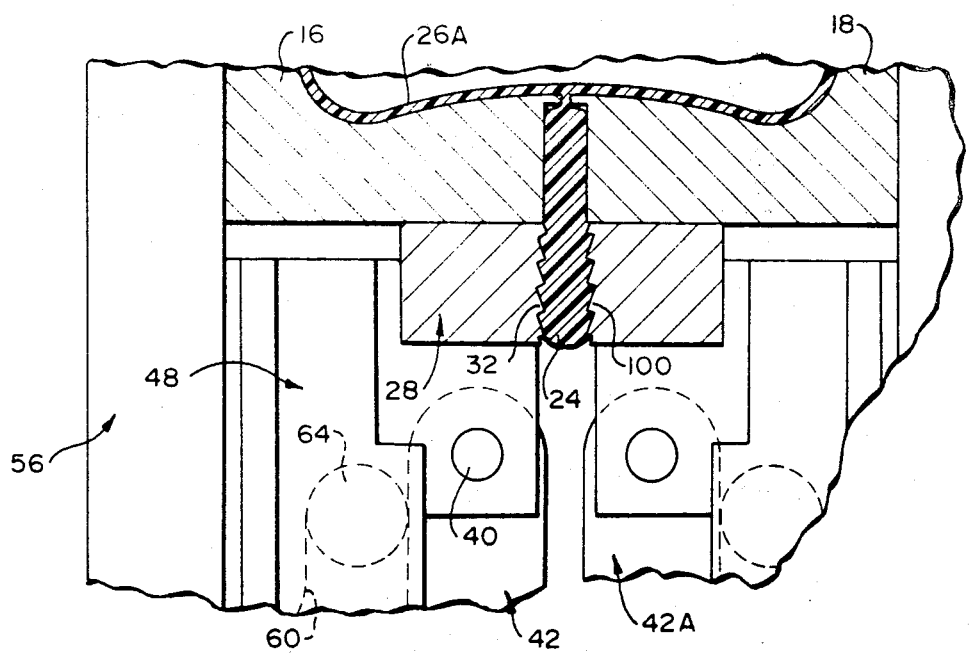
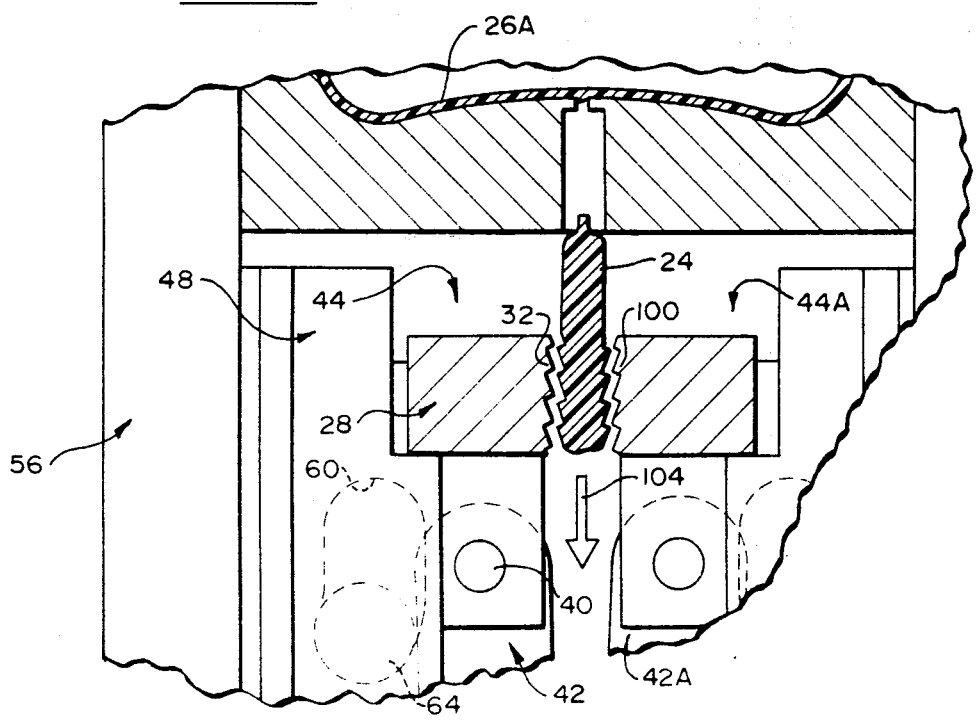

BLOW MOLDING DETABBER

FIELD OF THE INVENTION

This invention generally relates to so-called detabbing mechanisms for removing a tail or tab of plastic attached to an object formed in an extrusion blow molding machine and particularly concerns such a mechanism having a cam-actuated detabbing member movable between jaw-closed and jaw-open positions along an essentially rectilinear path of movement.

BACKGROUND OF THE INVENTION

Basic extrusion blow molding processes and machines have long been known in the art. In such machines, a tab of plastic attached to a base of a blow molded object such as a container is formed and must be removed prior to the completion of the process. A known detabbing bar or stripper bar which has been used in the past is supported for pivotal movement and is power-operated to pivot against a mating fixed stripper jaw for removing the tab from the molded object. Since mechanisms of the type described are normally operated on a continuous basis over a period of several weeks during extended production runs, the desirability for trouble-free maintenance operation and lubrication is a primary consideration, particularly when specifications for the molded object have demanding requirements for the object itself to be free of any lubrication contaminates from the forming process. A frequently encountered, and heretofore unsolved, problem involves undesirable marring by lubricants of the objects being formed, particularly lubricants used to service the known detabbing mechanisms associated with the blow molding process.

SUMMARY OF THE INVENTION

The detabbing mechanism of this invention features a detabbing jaw supported by a carriage for movement between a jaw-closed position and a jaw-open position. The carriage includes a movable support and a fixed frame therefor and cam and cam follower means between the movable support and the fixed frame. Power operating means are operatively connected to the movable support for moving the jaw along a predetermined path defined by the cam and cam follower means. Lubrication passageways are provided in the carriage for lubricating the cam and cam follower means, and such passageways are in isolated relation to the jaw and to the molded object having the tab which is to be removed.

BRIEF DESCRIPTION OF THE DRAWINGS

FIGS. 5A and 5B are fragmentary side elevational views, partly broken away and partly in section, respectively showing the apparatus of FIG. 2 in a jaw-closed position and a jaw-open position; and FIGS. 6A and 6B are views similar to those shown in FIGS. 5A and 5B of another embodiment of the apparatus of this invention in jaw-closed and jaw-open positions.

DETAILED DESCRIPTION OF PREFERRED EMBODIMENTS

Figure 1:
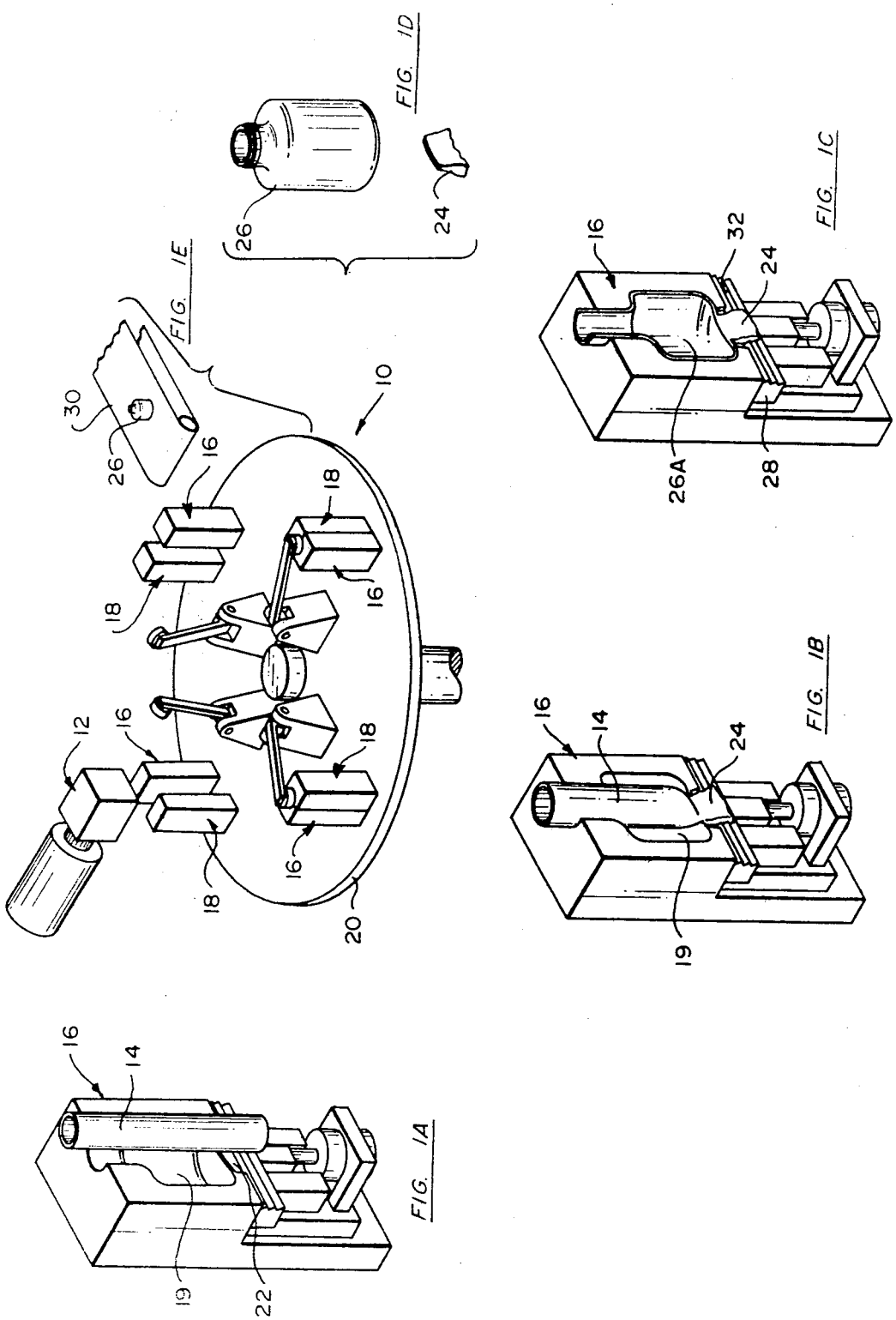
FIG. 1 including FIGS. 1A-1E comprises a schematic view of a conventional blow molding process utilizing a blow molding machine incorporating the detabbing apparatus of this invention.

Referring to the drawings in detail, a basic blow molding process is depicted in FIG. 1 utilizing a conventional blow molding machine 10 incorporating a plastic extruding head 12 for forming a plastic tube 14 (FIG. 1A) to be positioned between two halves 16, 18 of a mold set supported on a rotary table 20. The tube 14 which is formed is positioned to extend through mold cavities of the respective halves 16, 18 and protrude below the base of the mold set (only one mold cavity 19 being shown in FIG. 1A) through a so-called "pinch area" 22 immediately below the mold cavities. The mold set is then rotated (counter-clockwise as viewed in FIG. 1) into a second angular position wherein the halves 16, 18 of the mold set are closed and pinched to form a tab 24 depending from bottom of tube 14 in the pinch area 22 between the halves of the mold set (only one again being shown at 16 in FIG. 1B). Subsequent rotation of table 20 moves the mold set into a third angular position wherein air is forced by any suitable means, not shown, into the top of tube 14 to mold it into a container 26 conforming to the shape of the halves 16, 18 of the mold set (such as the container half 26A shown in FIG. 1C), and to cool the unit. It will be noted that the tab 24 of plastic on the container base is maintained in position below the base of the mold cavities in alignment with a stripper bar or detabber bar 28. The table is subsequently rotated into a discharge position wherein the mold halves 16, 18 are separated for ejection of the container 26 (FIG. 1D) onto any suitable conveyer such as schematically illustrated at 30 in FIG. 1E, and the container 26 itself is discharged with the tab 24 removed from its base.

Figure 2:
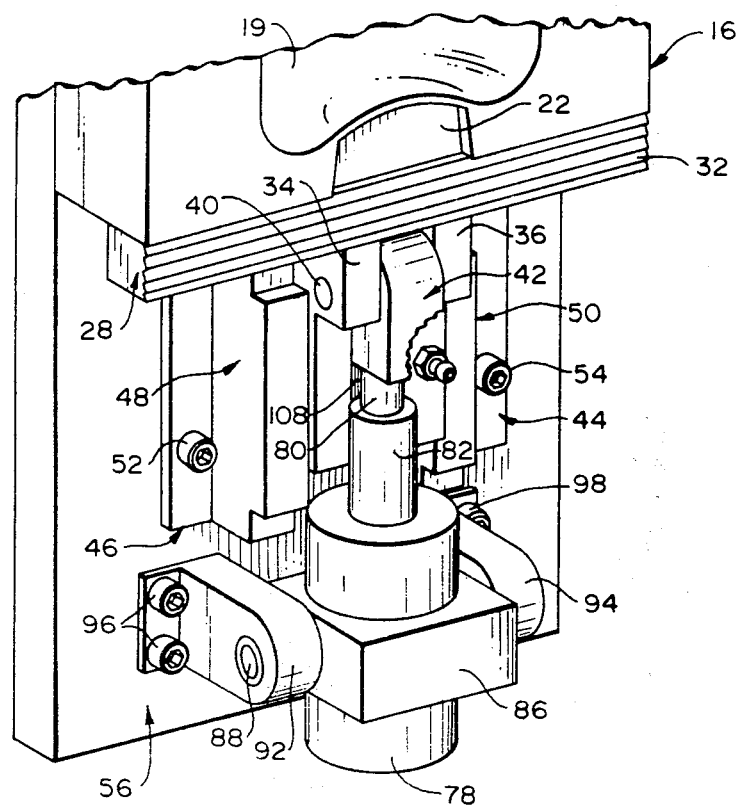
FIG. 2 is an isometric view, partly broken away, of the detabbing apparatus of this invention.

This invention is particularly concerned with a detabber mechanism for use with a blow molding machine of the general type described in FIG. 1 to remove the tab 24 formed at one end of a blow molded object such as the illustrated container 26. In the specifically illustrated embodiment, the detabber bar 28 is preferably elongated, and it is shown as extending horizontally in juxtaposed relation to the bottom of the mold half 16 and spaced from the bottom of its mold cavity 19 adjacent its pinch area 22 which extends down below the mold cavity 19. It is to be understood that the mechanism of this invention is equally useful with one or more mold sets for use in a continuous automatic detabbing process. The bar 28 is illustrated as having a serrated or grooved jaw face 32 and has depending integral legs 34, 36 (FIG. 2) secured by a roll pin 38 (FIG. 4) to a connecting rod 40 mounted in a movable support or slide 42 of a carriage 44 having an associated frame 46 comprising two cam blocks 48, 50 which in turn are fixed by suitable machine screws such as at 52 and 54 to mold body 56.

In accordance with this invention, provision is made to drive the jaw 32 of the bar 28 along a generally rectilinear path, downwardly in relation to the overlying mold half 16 and an opposing cooperating jaw 58, fixed in underlying relation to the other mold half 18 as shown in FIGS. 5A, 5B adjacent its pinch area 22A. More specifically, the cam blocks 48, 50 of the fixed frame 46 each have a pair of cam tracks or grooves such as at 60, 62 (FIG. 3) formed on an interior face of each cam block for defining a cam path for a pair of cam followers or cam rollers 64, 66 operatively mounted on the slide 42. It will suffice for an understanding of this invention to describe only that part of the cam actuating mechanism associated with cam block 48 since the other part associated with cam block 50 is in identical mirror image relation.

Figure 3:
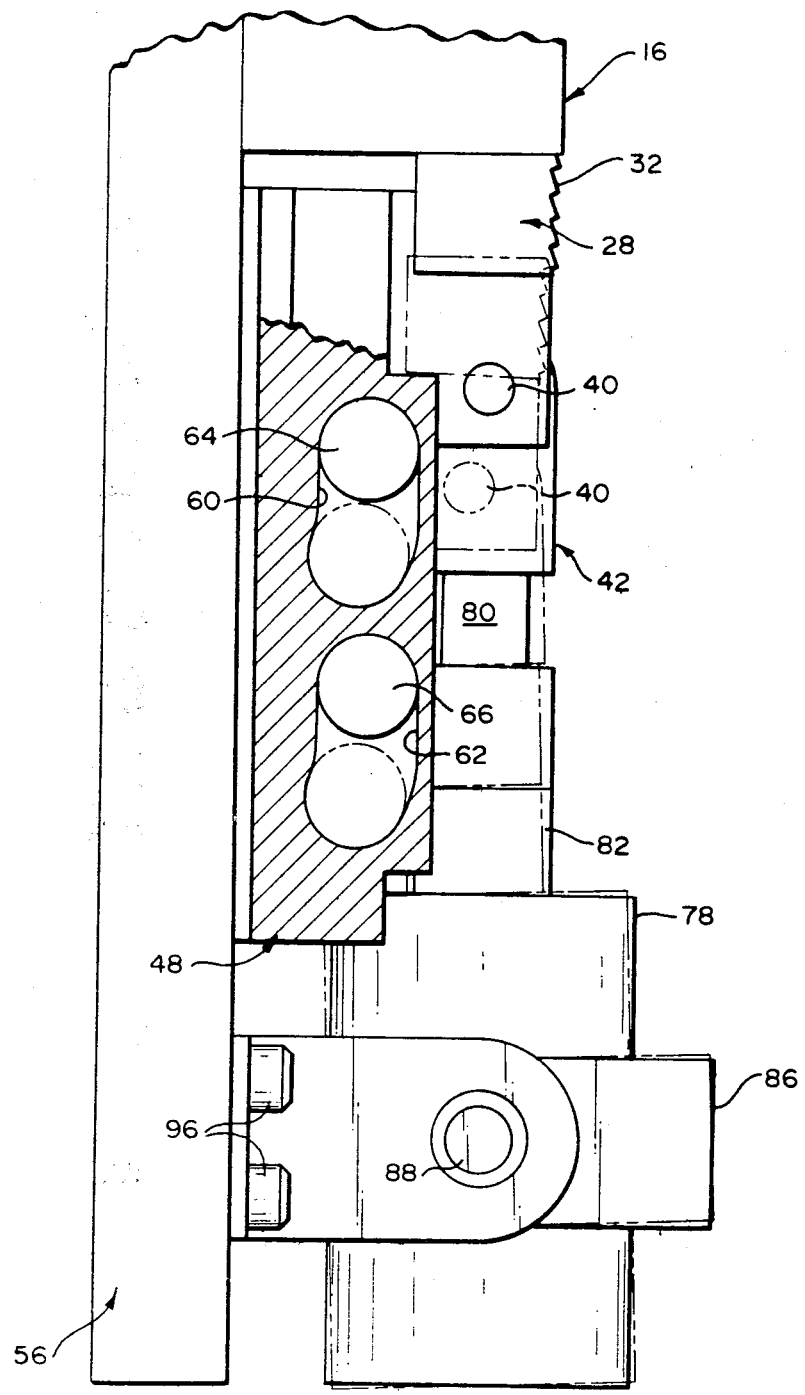
FIG. 3 is a side elevational view, partly broken away and partly in section, of the apparatus of FIG. 2.
Figure 4:
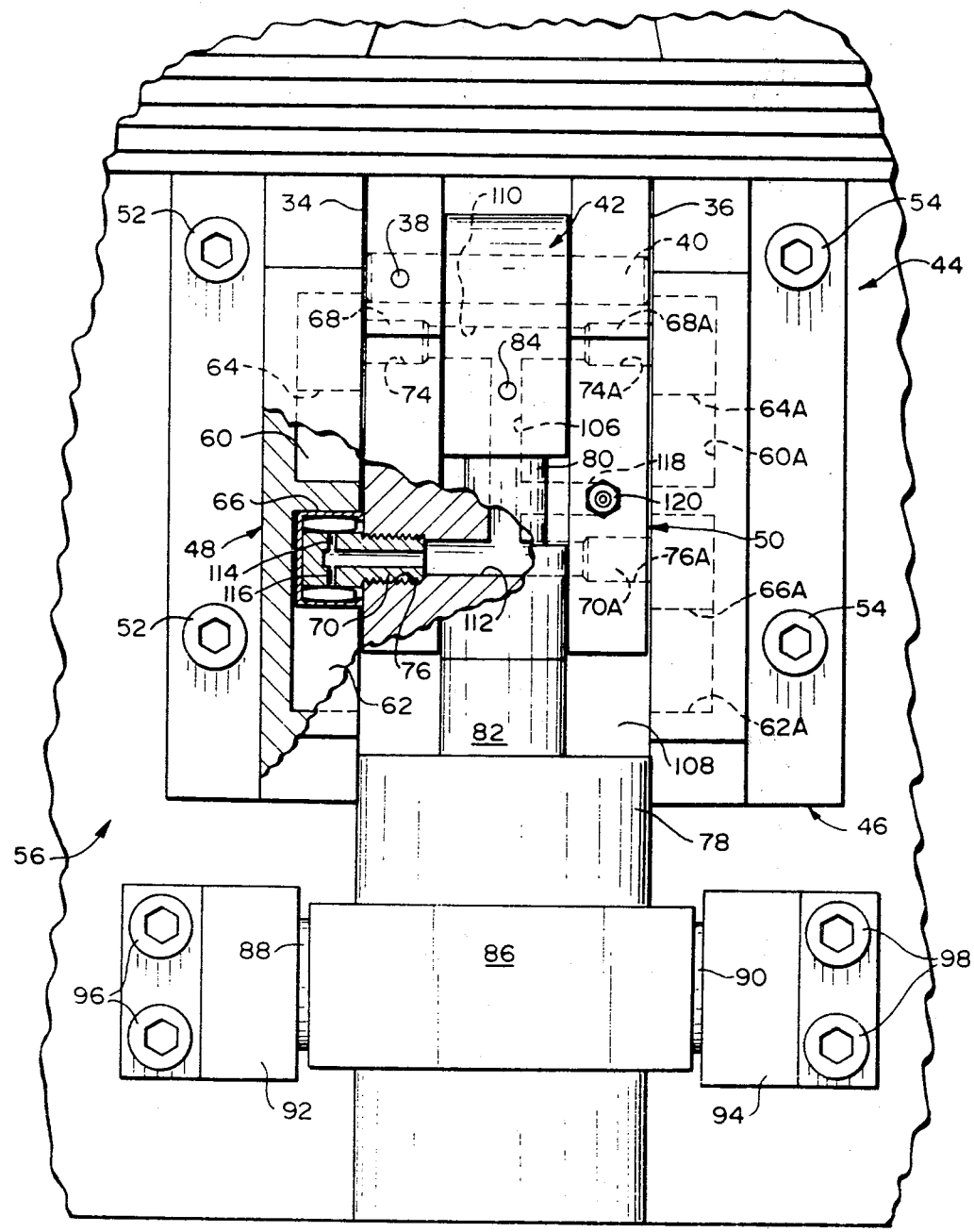
FIG. 4 is a front elevational view, partly broken away and partly in section, of the apparatus of FIG. 2.

As best seen in FIGS. 3 and 4, cam block 48 has generally vertically aligned, spaced cam grooves 60, 62 respectively receiving a cam roller 64, 66 of the associated slide 42 of carriage 44. The cam rollers 64 and 66 are operatively mounted respectively on protruding ends of axles 68 and 70 of the slide 42. As illustrated in FIG. 4, upper axles 68 and 68A of the two cam blocks 48, 50 are aligned and threadably engaged within suitably formed slide openings 74 and 74A which extend in perpendicular relation to the path of reciprocating movement of the slide 42 as defined by the cam grooves 60, 62 and 60A, 62A of cam blocks 48, 50 of the carriage frame 46. Likewise, the lower axles 70, 70A of blocks 48, 50 are aligned and threadably engaged within slide openings 76, 76A in slide 42.

To power operate the carriage slide, 42 and thereby the bar 28, a conventional double-acting power cylinder 78 housing a piston, not shown, is provided having a rod 80 extending through a guide sleeve 82 for reciprocating axial movement within the sleeve 82. The piston rod 80 is secured by a roll pin 84 to slide 42 of the carriage 44. The cylinder 78 itself is secured within a mounting block 86 pivotally supported on pivot pins 88, 90 housed within lugs 92, 94 fixed to the mold body 56 by fasteners 96, 98.

To provide a mechanism of the type described which is capable of providing repeated positive mechanical actions in continued automatic operation under demanding conditions with virtually maintenance-free requirements, the carriage 44 accordingly is specifically designed by virtue of the above described construction to support the slide 42 for essentially rectilinear movement to power operate the jaw 32 of the detabbing bar 28 between an operative tab-engaging, jaw-closed position (FIG. 5A) and a remote tab stripped, jaw-open position (FIG. 5B). As depicted in FIGS. 5A and 5B the movable grooved jaw 32 is designed to cooperate with a fixed cooperating smooth jaw such as illustrated at 58 in FIGS. 5A and 5B or, alternatively, with a cooperating movable grooved jaw such as depicted at 100 in FIGS. 6A and 6B. In the embodiment illustrated in FIGS. 6A and 6B, it is to be understood that the second movable grooved jaw 100 is supported on a slide 42A of a carriage 44A in substantially the same manner as described in connection with the first-referenced embodiment described above for substantially the same movement in synchronism with the first movable jaw 32.

As best seen in FIG. 3, the cam rollers 64 and 66 on one side of the slide 42 (as well as the other cam rollers 64A and 66A on the opposite side of the slide) move from the full line, jaw-closed position downwardly in an essentially straight-line path of movement to the illustrated broken line position indicative of the jaw open position of the detabbing mechanism. As will be appreciated from consideration of the cam grooves 60, 62 depicted in FIG. 3, the movement of the jaw 32 is essentially a straight line movement for the major downward throw of the mechanism due to the essentially straight line nature of the cam grooves. However, each of the cam grooves are intentionally and identically formed with an arcuate configuration at the base of each groove whereby the cam rollers, slide 42, and accordingly the jaw 32 through the driving conection to the detabbing bar 28, is retracted toward the base of the cam block connection to the mold body 56. Accordingly, jaw 32 moves not only downwardly in an essentially straight line path of movement, but also, inwardly toward the mold body 56 at the end of its stroke to effect an intentional terminal separation of the jaw 32 from its cooperating jaw (such as the fixed jaw 58 in FIGS. 5A, 5B and the cooperating movable grooved jaw 100 in FIGS. 6A, 6B). Such action not only accommodates a basic detabbing or stripping motion effected by the jaws on the depending tab 24 at the base of the molded container 26, but additionally permits ready ejection of that tab 24 (FIG. 5B, 6B) from the mechanism whereby the container 26 itself is readily discharged in a tab-free condition.

By virtue of the previously described mounting of the cylinder assembly, reciprocating movement of the slide 42 is provided between the jaw-closed and jaw-open positions while additionally accommodating for the terminal retraction of slide 42 and detabbing bar 28 as determined by the action of the cam rollers 64, 64A and 66, 66A within the terminal ends of their respective cam grooves 60, 60A and 62, 62A to effect a discrete pivotal terminal movement of slide 42 separating the jaws of the detabbing bar 28. As will be appreciated, the double-acting cylinder 78 is conventionally provided with suitable supply and exhaust lines, not shown, at each end of the double-acting cylinder for exhausting and supplying opposite ends of the cylinder alternately for reciprocating the piston and accordingly power driving the carriage 44 via the piston rod 80 in the jaw-opening direction as depicted by arrow 102 and 104 in FIG. 5B and FIG. 6B and in a jaw-closing direction opposite the referenced arrows in timed relation to operation of the automatic blow molding machine prior to discharge of the molded container 26.

Detabbing mechanisms of the type described are particularly designed for use with machines of the general type schematically shown in FIG. 1, and these machines are intended to be continuously operated 24 hours a day, day after day, for extended periods of time. A longstanding, troublesome problem which hitherto has never been solved, but is frequently encountered, involves contamination of the blow molded objects by the lubricants required by the various moving parts of the machine. In accordance with yet another feature of this invention, the carriage 44 is provided continuous lubrication within a closed region of its slide 42 and its fixed cam blocks 48, 50 by virtue of a unique lubricant passageway system which is designed specifically to be in totally remote, isolated relation to any object to be molded.

More specifically, a main lubricating passageway 106 extends axially through a central web 108 (FIGS. 2 and 4) of the slide 42 with cross passages 110 and 112 at opposite axial ends of passageway 106 which communicate with the mounting axles 68, 68A and 70, 70A, respectively, for each of the cam rollers. As best seen in FIG. 4, cross passage 112 terminates in oppositely directed radial openings 114 and 116 within the body of axle 70 to continuously provide lubricant for the cam roller 66 rotatably mounted thereon for movement within cam groove 62 of cam block 48. Each of the other axles are preferably provided with an identical lubrication system. The main passageway 106 has a laterally-extending passage 118 connected to a fitting 120 (FIGS. 2 and 4) of any suitable type which may be readily connected to a conventional lubricating gun, not shown, to force lubricant into the passageway system on demand for automatically lubricating the cam rollers within each of the cam grooves.

The detabber apparatus of this invention has been found to operate continuously under demanding conditions with minimal maintenance requirements over extended production runs and without undesirably contaminating any of the blow molded objects formed. The generally straight line tab stripping motion effected by the detabbing bar provides a positive mechanical motion affording excellent gripping of the tab to be removed from the blow molded object, thereby conistently effecting high-quality detabbing in timed relation to a continuously operating blow molding process.

As will be apparent to persons skilled in the art, various modifications, adaptations and variations of the foregoing specific disclosure can be made without departing from the teachings of this invention.

I claim:

1. Apparatus for use with a blow molding machine to remove a tab formed at one end of a blow-molded object and comprising a mold defining the shape of the object to be blow-molded, a carriage having a fixed frame secured to the mold and a slide supported for movement on the frame, a first jaw and a cooperating second jaw, each jaw being associated with one half of the mold, the first jaw being supported by the carriage slide for movement from a position juxtaposed with the bottom of the mold to a position spaced therefrom, the slide including an axle with rollers at opposite ends, the fixed frame providing a pair of recessed cam grooves embracing the rollers to guide the first jaw for movement in a substantially rectilinear path from a first position juxtaposed with the mold and in close contact with the cooperating second jaw to a second position spaced from the mold and from the cooperating second jaw, and passageways defined in the axle in isolated relation to the first jaw and to the blow-molded object having the tab which is to be removed, the passageways serving to admit lubricant for said rollers and cam grooves.

2. The apparatus of claim 1 wherein the first jaw has a grooved face, wherein the cooperating jaw is a second grooved jaw supported by a carriage in substantially the same manner for substantially the same movement as the first jaw.

3. The apparatus of claim 1 wherein the cam groove is configured to provide rectilinear movement of the cam follower means from a first jaw-closed position wherein the first jaw is adjacent the bottom of the mold, and toward a second jaw-open position wherein the first jaw is positioned remote from the mold, the cam groove having one end with an arcuate terminal configuration to effect a jaw separating action as the cam follower means approaches said second jaw-open position as defined by said one end of the cam groove.

4. The apparatus of claim 1 wherein the carriage slide is power driven in each direction of jaw movement.

5. The apparatus of claim 1 wherein the slide includes a second axle with rollers at opposite ends, wherein the said fixed frame provides a second pair of recessed cam grooves embracing the rollers of the second axle, the configuration of the second pair of recessed cam grooves being substantially identical to the first pair of recessed cam grooves, wherein the second axle has passageways in isolated relation to the first jaw and to the blow-molded object having the tab which is to be removed, the passageways serving to admit lubricant for the rollers of the second axle and the second pair of recessed cam grooves, and wherein the lubricating passageways in each axle are fed from a common lubricating aperture.

6. The apparatus of claim 3 wherein a double-acting power cylinder is drivingly connected to the first jaw for moving it between its first and second positions.

7. The apparatus of claim 6 including means for supporting the power cylinder for pivoting movement about an axis perpendicular to the path of movement of the first jaw between its first and second positions for accommodating jaw separating and jaw return movements effected by the arcuate end of the cam groove.

8. The apparatus of claim 1 wherein the cooperating second jaw is a fixed member.

* * * * *